United States Patent [19]

Lindsay

[11] Patent Number: 4,596,166
[45] Date of Patent: Jun. 24, 1986

[54] END MILLING CUTTER AND METHOD OF MAKING SAME

[76] Inventor: Harold W. Lindsay, 2451 NW. 30th, Portland, Oreg. 97210

[21] Appl. No.: 736,947

[22] Filed: May 22, 1985

[51] Int. Cl.[4] .................................................. B21K 5/12
[52] U.S. Cl. ..................................... 76/101 A; 29/464
[58] Field of Search ............. 76/101 R, 101 A, 108 R; 29/464, 465, 467, 468, 445

[56] References Cited

U.S. PATENT DOCUMENTS

| 1,614,288 | 1/1927 | Dewey . | |
|---|---|---|---|
| 1,798,314 | 3/1931 | Dillard | 76/101 A |
| 2,345,462 | 3/1944 | Coughlin . | |
| 2,400,856 | 5/1946 | Thompson . | |
| 3,217,384 | 11/1965 | Wirfelt . | |
| 3,380,137 | 4/1968 | MacPetrie et al. . | |
| 3,551,978 | 1/1971 | Berry, Jr. . | |
| 3,633,258 | 1/1972 | Szabo . | |
| 3,814,536 | 6/1974 | Garrett . | |
| 4,096,613 | 6/1978 | Takacs et al. . | |

FOREIGN PATENT DOCUMENTS 944139  3/1974  Canada .

Primary Examiner—Roscoe V. Parker
Attorney, Agent, or Firm—Klarquist, Sparkman, Campbell, Leigh & Whinston

[57] ABSTRACT

An end milling cutter has a cutter head with a pair of opposed slots extending longitudinally inwardly from the end face and generally radially from the lateral surface to a central cylindrical bore. Each slot forms insert-supporting shoulders which extend from the core to the lateral surface of the head. A triangular cutting insert is received in each slot and is supported on one side by the shoulders. A pressed dimple extending inwardly of the cutter head from the end face, engages and supports a second side of each of the inserts such that the cutting edges thereof are at a prescribed diameter.

5 Claims, 6 Drawing Figures

U.S. Patent Jun. 24, 1986 Sheet 1 of 2 4,596,166
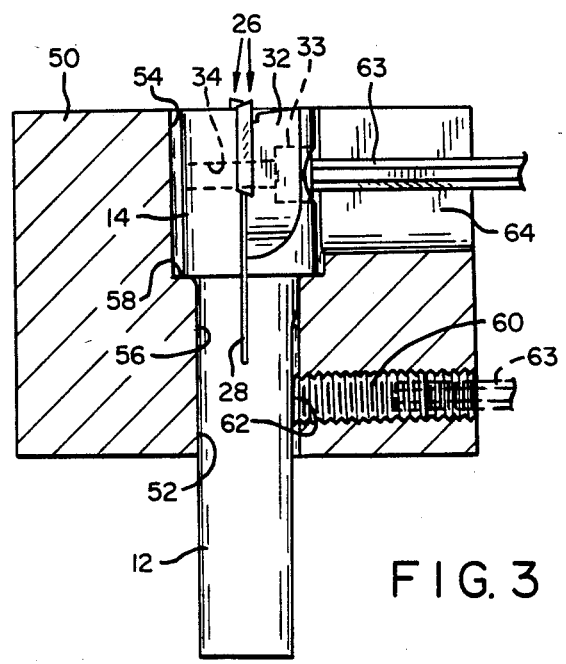
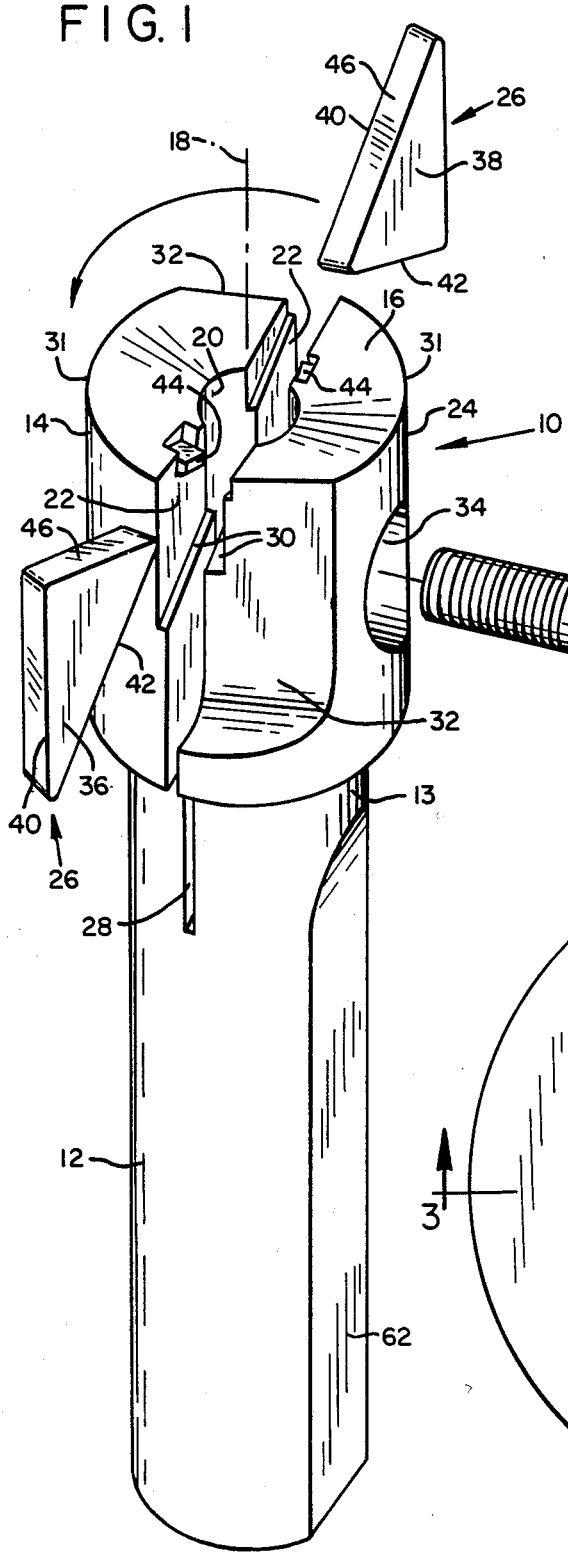
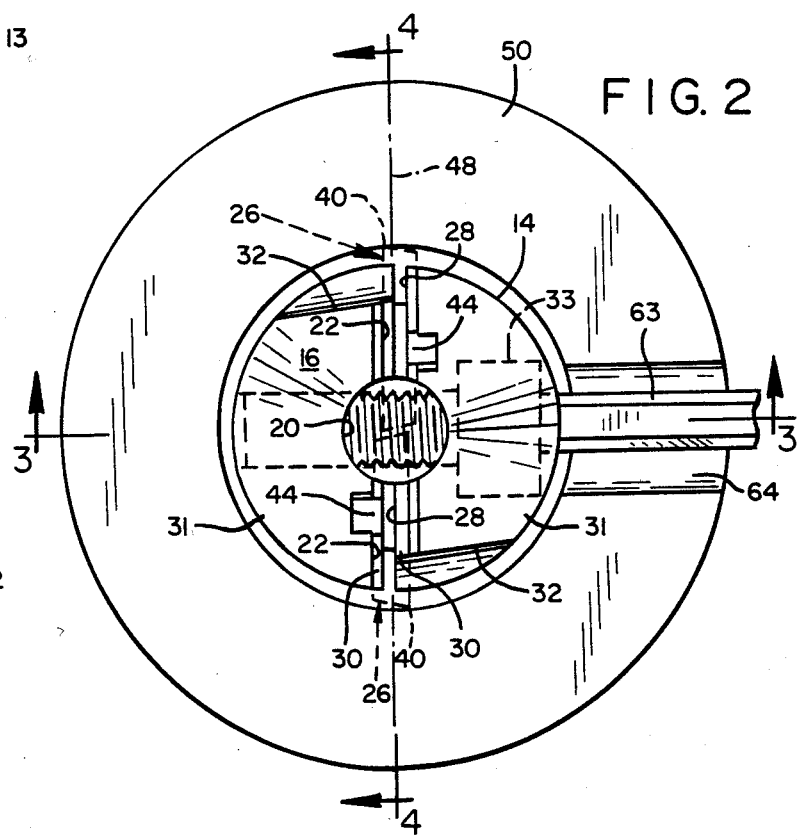

END MILLING CUTTER AND METHOD OF MAKING SAME

BACKGROUND OF THE INVENTION

This invention relates to end milling cutters for machine tools and more particularly, to end milling cutters utilizing replaceable cutting inserts.

End milling cutters heretofore known have utilized replaceable cutting inserts which are retained between cooperating jaw elements formed in the cutter head. An end milling cutter of this general type is shown in my Canadian Pat. No. 944,139. The accurate positioning of the cutting edges of the inserts, however, has posed a problem as respects cutters of this type.

Accordingly, it is a primary object of the present invention to provide an end milling cutter having a pair of cooperating jaw elements between which are positioned replaceable cutting inserts whose cutting edges are accurately disposed at a prescribed diameter.

It is a further object of the present invention to provide an end milling cutter of the above type which is subject to quick and economical manufacture.

It is a still further object of the present invention to provide an end milling cutter of the above type which utilizes a pressed dimple accurately to position the cutting edge of a cutting insert held in the cutter.

Other objects and features of the invention will be apparent in the following description and claims wherein the features of the cutter are set out together with a preferred method of making the same.

DESCRIPTION OF THE DRAWINGS

FIG. 1 is an exploded perspective view of the cutter of the invention;

FIG. 2 is a top plan view of the cutter mounted in a fixture for dimpling;

FIG. 3 is a reduced scale sectional view on line 3—3 of FIG. 2 with portions of the cutter broken away;

DESCRIPTION OF THE PREFERRED EMBODIMENT

Figure 4:
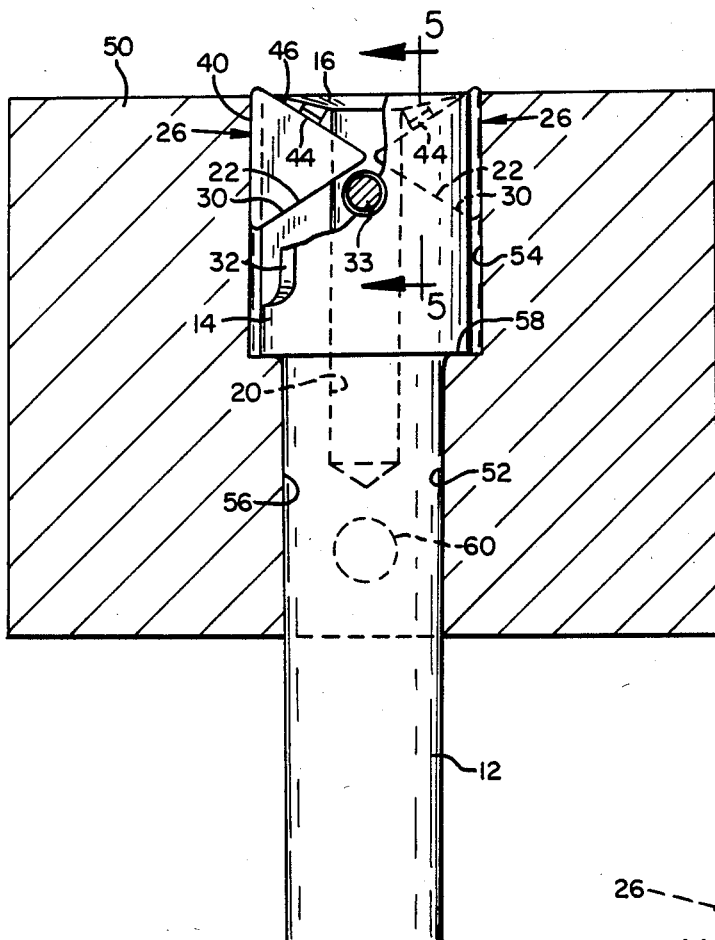
FIG. 4 is a sectional view taken on line 4—4 of FIG. 2.
Figure 5:
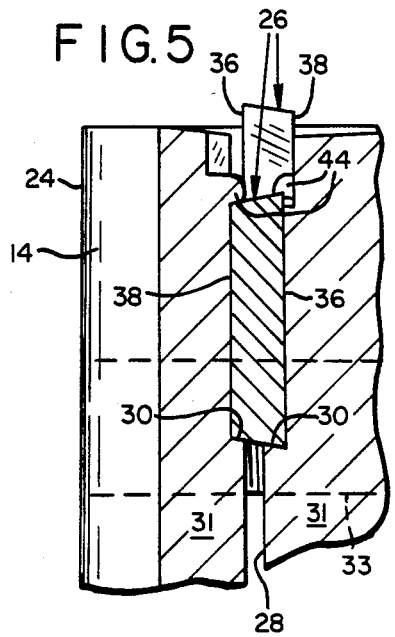
FIG. 5 is an enlarged sectional view taken on line 5—5 of FIG. 4.

Referring to the drawings, an illustrative embodiment of my end milling cutter 10 comprises a shank 12 of high-speed steel having at one end 13 a generally cylindrical cutter head 14 having a conically dished end face 16 normal to the axis 18 thereof. The diameter of shank 12 is less than the diameter of cutter head 14. A cylindrical bore 20 is drilled coaxially longitudinally inwardly from end face 16 substantially the length of head 14.

Figure 6:
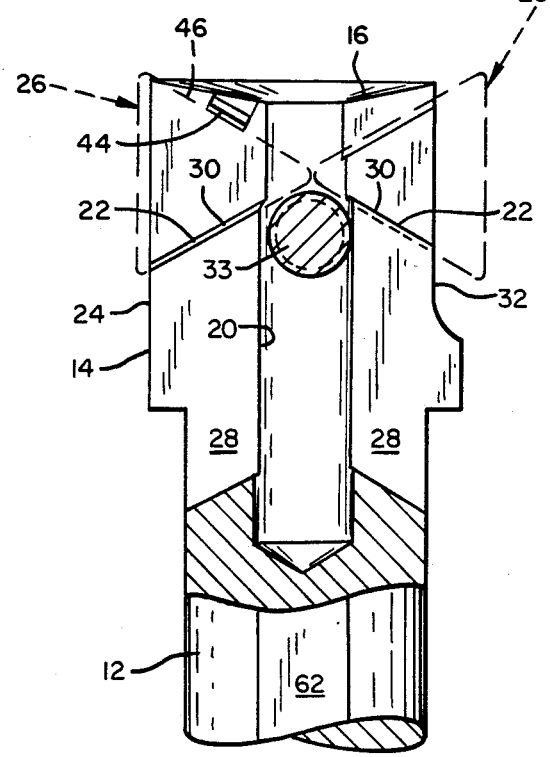
FIG. 6 is a sectional view similar to FIG. 4 but of the cutter only and to an enlarged scale.

A pair of generally radially extending negative rake slots 22 are cut in opposite sides of head 14 at an angle of about sixty degrees with respect to the lateral surface 24 of the head. Each of the slots 22 is sloped oppositely to the other (see FIGS. 4 and 6). The slots 22 are of a width substantially equal to the thickness of a cutting insert 26. Slots 22 extend longitudinally inwardly from end face 16 and extend generally radially from lateral surface 24, passing through bore 20 as shown (see FIG. 1). Of course, although slots 22 are shown with negative rake, they can also be at neutral or positive rake angles.

A second pair of slots 28 are cut in opposite sides of head 14 at a lesser width than slots 22. Slots 28 extend slots 22 longitudinally of cutter head 14 and also extend radially inwardly from lateral surface 24 to bore 20. In this manner slots 22 form supporting shoulders 30 on both sides of slots 28. Thus, bore 20 and slots 22 and 28 define a pair of cooperating jaw elements 31 in cutter head 14. Surfaces 24 are milled adjacent slots 22 to form chip clearance cut-outs 32 to allow for adequate chip removal.

A socket head cap screw 33 is received in a drilled, tapped and counterbored generally radially-extending hole 34 passing through jaw elements 31 transversely of cutter head 14. Hole 34 is generally normal to slots 22 and 28 and intersects bore 20 as shown (see FIG. 2).

Triangular cutting inserts 26, formed of tungsten carbide or sintered ceramic cutting material and having faces 36, 38 and cutting edges 40, are received in each of slots 22, such that shoulders 30 support one side 42 of each of inserts 26. Screw 33 when tightened clamps inserts 26 in slots 22 between jaw elements 31.

A pair of pressed dimples 44, one on each of jaw elements 31, extend inwardly of head 14 from end face 16 to engage and support a second side 46 of inserts 26. Each of dimples 44 is positioned on an opposite side of a diameter 48 of head 14.

A feature of the invention resides in the method of making cutter 10 such that cutting edges 40 of inserts 26 are positioned on a prescribed diameter. A fixture 50 (see FIGS. 2, 3 and 4) is utilized for this purpose.

Fixture 50 includes a center bore 52 including a first cylindrical inner surface 54, the diameter of which is greater than that of head 14 but precisely equal to the desired cutting diameter for edges 40 of inserts 26. Bore 52 further comprises a cylindrical support hole 56 which is coaxial with surface 54 and has a diameter equal to that of shank 12. Because the diameter of hole 56 is less than that of surface 54, a shoulder 58 is formed in fixture 50.

My method of making my cutter thus comprises first drilling cylindrical bore 20 coaxially of cutter head 14 and generally coextensive in length therewith. Slots 22 are then cut in opposite sides of head 14 to a width substantially equal to the thickness of cutting inserts 26. Slots 22 are cut at an angle of sixty degrees with respect to lateral surface 24 of head 14, each of slots 22 being sloped oppositely to the other, but extending longitudinally inwardly from end face 16 and generally radially from surface 24 to bore 20.

Second slots 28 are then cut in opposite sides of head 14, extending the first slots 22 longitudinally of head 14 and extending radially inwardly from surface 24 also to bore 20. Slots 28 are of a width less than that of slots 22, whereby supporting shoulders 30 are formed on the sides of second slots 28. As stated hereinabove, bore 20 and slots 22 and 28 define jaw elements 31 of the cutter.

Cutter 10 is then placed in fixture 50, shank 12 being received in support hole 56 and head 14 being received within surface 54 and supported by shoulder 58. The cutter is thus supported by the fixture. A set screw 60 in fixture 50 is tightened to hold shank 12 securely, screw 60 engaging a flat 62 on shank 12.

Inserts 26 are then placed in slots 22 such that insert sides 42 slide radially outwardly along shoulders 30 until the inserts contact surface 54. See FIGS. 2 and 4. Screw 33 is then lightly tightened by inserting an allen wrench 63 in fixture slot 64. Cutter 10 is then ready for dimpling.

With the cutter thus disposed in fixture 50, dimples 44 are then pressed longitudinally inwardly of each jaw element 31 from end face 16 perpendicular to insert sides 46 on opposite sides of cutter head diameter 48. Pressing of dimples 44 retains cutting edges 40 of triangular inserts 26 in their position abutting inner surface 54 of fixture 50, the dimples 44 contacting the second sides 46 of inserts 26, the diametrical extent of cutting edges 40 thereby being made precisely equal to the diameter of cylindrical surface 54 of fixture 50. If necessary, clamping screw 33 is slightly loosened before pressing dimples 44.

The above described method permits quick and economical manufacture of the cutters, yet results in a tool wherein the cutting edges of the inserts are accurately disposed at the prescribed diameter represented by surface 54 of fixture 50. Cooperation between slots 22, which form shoulders 30 to support sides 42 of inserts 26, and dimples 44 which abut and support sides 46 thereof, results in the inserts being properly supported as well as accurately positioned.

I claim:

1. A method of making an end milling cutter having a pair of cooperating jaw elements forming opposed slots in a cutter head, the head having a pair of cutting inserts having cutting edges on a prescribed diameter, comprising:

drilling a cylindrical bore in a cylindrical end miling cutter head, the bore being coaxial with the cutter head and generally co-extensive in length therewith;

cutting a pair of generally radially extending first slots in opposite sides of the cutter head, the first slots being of a width substantially equal to the thickness of a cutting insert, the first slots extending longitudinally inwardly from the end face of the cutter and generally radially from the lateral surface of the cutter head to the cylindrical bore;

cutting a pair of second slots in the cutter head, the second slots extending the first slots longitudinally of the cutter head, the second slots extending radially inwardly from the lateral surface of the cutter head to the cylindrical bore, the second slots being of a width less than the width of the first slots, whereby each of the first slots form a supporting shoulder on at least one of the sides of the second slots, the bore and the first and second slots defining a pair of cooperating jaw elements in the cutter head;

placing a cutting insert in each of the first slots, one side of each of the inserts engaging the respective supporting shoulder;

placing the cutter head and the inserts in a fixture, the fixture having a first cylindrical inner surface, the diameter of the first cylindrical inner surface being greater than the diameter of the cutter head and equal to a desired cutting diameter for the cutting edges of the inserts, the one sides of the inserts being supported by the shoulders in their respective slots, the inserts sliding radially outwardly along the shoulders until the inserts contact the first cylindrical inner surface of the fixture; and pressing a dimple longitudinally inwardly of each jaw element from the end face of the cutter head on the other side of each of the pair of second slots until the dimple contacts a second side of each of the inserts, the dimples retaining the cutting edges of the inserts in position abutting the first cylindrical inner surface of the fixture, the diametrical extent of the cutting edges of the inserts thereby being made equal to the diameter of the first cylindrical inner surface of the fixture.

2. A method as in claim 1 in which the first slots are cut at an angle of about 60° with respect to the lateral surface of the cutter head, each of the first slots being sloped oppositely to the other, and the cutting inserts are triangular.

3. A method as in claim 1 in which the dimples are pressed on opposite sides of a diameter of the cutter head.

4. A method as in claim 1, further comprising:

drilling and tapping a radially extending hole through the jaw elements, the hole being generally normal to the first and second slots, the hole intersecting the cylindrical bore;

inserting a clamping screw through the hole; and tightening the clamping screw to retain the inserts in the first slots when placing the cutter head and the inserts in the fixture.

5. A method as in claim 1, further comprising:

forming a cylindrical shank on the cutter head, the diameter of the shank being less than the diameter of the cutter head;

the fixture having a cylindrical support hole coaxial with the first cylindrical inner surface, the support hole having a diameter equal to the diameter of the shank but less than the diameter of the first cylindrical inner surface, thereby to form a shoulder in the fixture; and placing the shank in the support hole to support the shank with the cutter head being supported by the shoulder of the fixture.

* * * * *